Aug. 6, 1940.  C. H. LENGYEL  2,210,551
FURNACE
Filed Aug. 9, 1939

INVENTOR
Carl H. Lengyel
BY
Beau, Brooks, Buckley & Beau.
ATTORNEYS

Patented Aug. 6, 1940

2,210,551

UNITED STATES PATENT OFFICE 2,210,551

FURNACE

Carl H. Lengyel, Kenmore, N. Y.

Application August 9, 1939, Serial No. 289,255

7 Claims. (Cl. 158—7)

This invention relates to furnaces and has particular reference to an arrangement and apparatus for affording a more efficient utilization of the chemical energy of fuels of various kinds by combustion thereof.

An object which is of primary importance in proceeding according to the teachings of my present invention involves substantially preheating air coming into a furnace before it arrives at the place where the principal or actual combustion occurs. This object is attained by providing means for efficiently conducting a portion of the heat of combustion backward with respect to the direction of flow of draft air to a point where such heat may be efficiently utilized to pre-heat incoming air. The apparatus of my invention provides further for a more efficient transfer of the heat of combustion for general use in heating and a more complete appropriation thereof to useful output purposes. Procedure in accordance with the teaching of my invention is found, further, to result in a far more complete combustion of the fuel and a more rapid transfer of the heat of combustion to the air passing through the zone of combustion.

The invention disclosed in my present application is an improvement in the apparatus disclosed and claimed in my co-pending application Serial No. 259,186, filed March 1, 1939, now Patent No. 2,171,002, dated August 29, 1939. As is there disclosed, procedure according to the general principles of my invention involves the use of a fire pot or combustion chamber so arranged that all of the incoming atmosphere is received through an annular conduit which has communication with the lower portion of the combustion chamber. The actual combustion is preferably arranged to take place in the vicinity of the upper rim of such annular conduit where it communicates with the interior of the fire pot. This may be accomplished by providing an annular burner adapted to give forth an annular ring of flame which may be either continuous or discontinuous. That is, the annular ring of flame may comprise a solid film or be made up of numerous circularly arranged fuel burning jets.

Multiple stage heating is not, as a broad concept, original with me, my invention residing in the novel manner in which plural effect heating is accomplished. Previous examples of step or multiple effect heating have depended upon the provision of multiple heating chambers and on multiple fuel burners. In my present invention the effect of step-heating is achieved without such complication of the apparatus and by utilizing the high heat conductivity of iron or like material in a novel manner. In proceeding according to the invention disclosed in my present application a special heat conducting and radiating element is provided for cooperation with the annular conduit, the fuel burner, and the walls of the combustion chamber. The precise form of this element may be varied but a highly satisfactory embodiment of the apparatus of my present invention comprises a body which is hollow and has a lower portion which is generally similar in conformation and nearly as large as the lower portion of the interior of the combustion chamber of the furnace with which it is associated. This body is formed of material which has a relatively high heat conductivity, cast iron being well suited to the requirements presented, and the casing has a lower terminal portion which in effect extends downwardly into the annular conduit. A body having a downwardly convex contour at its lower portion is found to be well suited to the purposes in view.

A plurality of outwardly radiating fins are associated with the exterior surface of the hollow body in such manner that they cooperate, not only in augmenting the heat absorbing and conducting potentialities of the body itself, but also in correctly and conveniently locating and positioning the body with respect to the other elements of the furnace construction.

A further feature of my present construction resides in the fact that the extent of projection of the several fins from the body itself is readily adjustable so that a given heat conducting and localizing body may be adapted for use in a wide variety of furnaces having varying interior dimensions and proportions.

The casing walls are of moderate thickness and the hollow interior of the casing is preferably filled with material having good heat insulating qualities, rock wool having been found highly satisfactory for the purposes of the present invention. It will be seen from this that heat imparted to the casing in the zone of combustion will be conducted rapidly along the wall of the casing and experiment shows that in an installation comparable in size and proportion to a usual domestic conversion burner installation the casing wall becomes cherry red within a relatively short period of time and over a considerable area, such area extending down to the very bottom of the casing where it is disposed within the annular conduit.

As a result of this heating of the casing walls to a relatively high temperature the incoming draft air, which enters upwardly through the annular conduit must of necessity come into close proximity to the highly heated surface of the lower portion of the casing wall and in fact the major portion of such draft will, by virtue of the arrangement of the parts of the apparatus, traverse a large portion of the part of the casing wall which is disposed below the actual burners.

The result of the foregoing operation is that the draft air, upon its arrival at the burners, has already been brought to a relatively high temperature, as compared with the temperature of draft air in prior art devices of this type, and the gas, or carbureted fuel if such be used, is burning in an atmosphere which is very much closer to its natural combustion temperature with a consequently more thorough, efficient, and complete liberation, in the form of heat, of the chemical energy contained in the fuel.

A further improvement in efficiency is effected by the arrangement of the walls of the casing with respect to the walls of the fire pot or combustion chamber as these elements extend upwardly above the burners. The proximity of the casing wall to the interior surface of the combustion chamber results in radiation of heat to the latter in a manner which will appear from a further consideration of the details of construction of the casing itself.

For disclosing a complete embodiment of my invention I have illustrated the principles thereof in connection with a furnace of a type widely employed domestically and having a conversion burner associated therewith. It is to be understood, however, that this embodiment is chosen merely by way of example and that such modifications as are dictated by varying conditions may be made without departing from the spirit or scope of the present invention as defined in the appended claims.

In the drawing:

Fig. 3 is a bottom plan view of one form of the hollow heat conducting body hereinbefore referred to.

Figure 1:
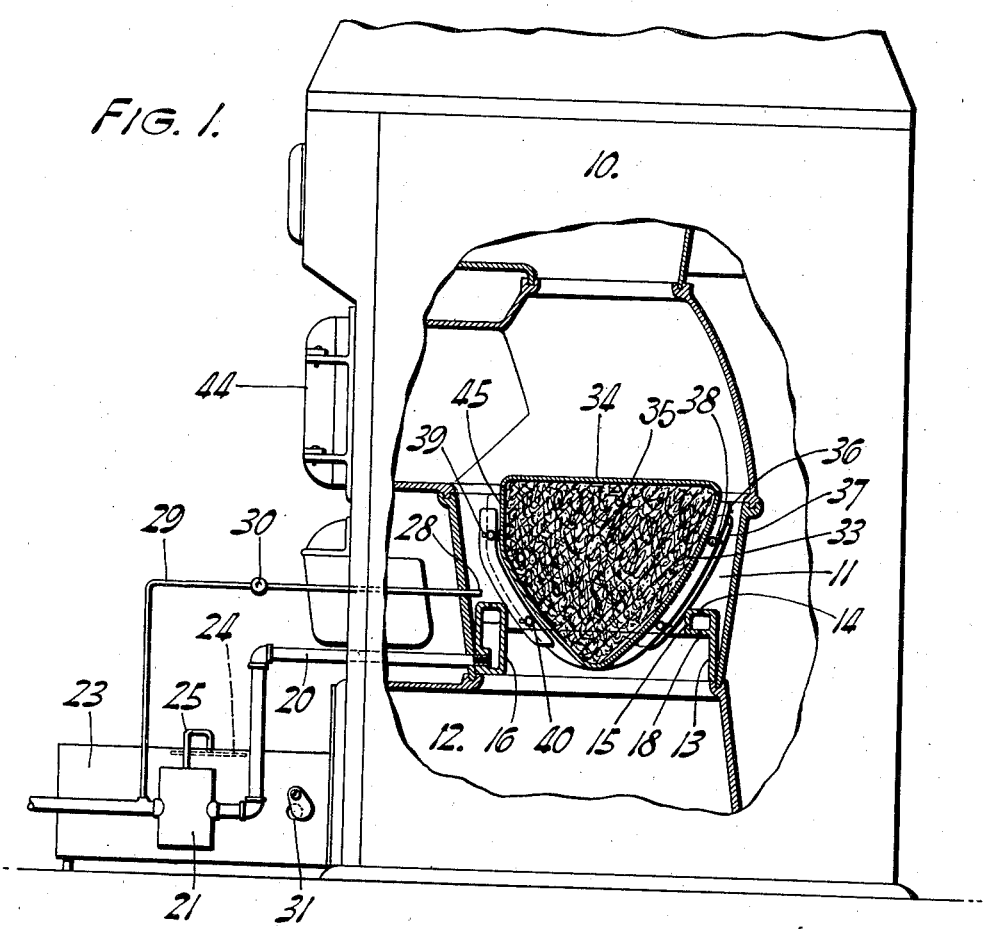
Fig. 1 is a general side elevational view of a furnace with portions broken away to show the fire pot and combustion chamber thereof, which latter parts are illustrated in vertical cross section.

In the drawing like characters of reference denote like parts and the numeral 10 designates a furnace casing having therein a fire pot and combustion chamber 11 which may be of conventional sectional construction. Suitable means are provided for circulating air through the furnace 10 and about and in contact with the outside of the combustion chamber 11 to heat the air for transmission to other points, usually to the room of a building to be heated. The novelty of the present invention, as it affects the construction of a furnace of the type being used as an example, is confined to the interior of the combustion chamber and the draft passage thereto and the remaining construction of the furnace proper may therefore be along conventional lines and will not be discussed in detail.

It will be noted that the combined fire pot and combustion chamber shown in the drawing has a lower annular portion which converges downwardly and an upper annular portion which converges upwardly, so that the combined device 11 has an enlarged medial portion and converging tapered portions extending both upwardly and downwardly therefrom. Where the furnace has originally been designed for use with solid fuel an ash pit will be disposed beneath the fire pot and combustion chamber 11 as at 12 and the ash pit also serves to convey draft air to the combustion chamber. In any event some source of air for supporting combustion will be provided at the lower side of the casing which houses the burner or other primary heat source.

In one means for accomplishing the results aimed at in my invention I provide an annular ring 13 which serves as an upward extension of the opening connecting the ash pit 12 or other draft source with the fire pot or combustion chamber 11. The burning means are to be arranged in intimate association with the upper terminus of the ring 13 and for convenience of manufacture the upper end of the ring 13 may itself be formed with a continuous slot 14 for emitting a circular film of fluid fuel and thereby comprise an annular combustion jet.

Figure 2:
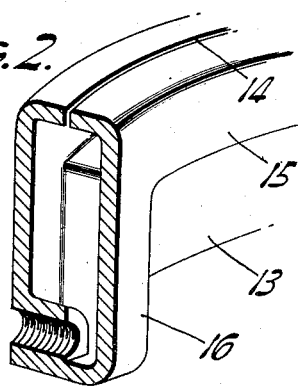
Fig. 2 is a fragmentary perspective view of one form of combined fuel burner and draft confining means in transverse cross section.
Figure 3:
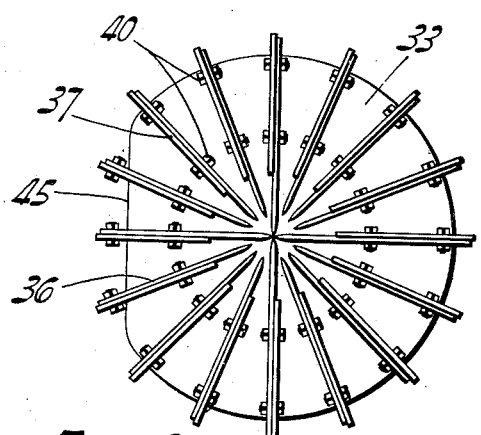

As appears from a consideration of Figs. 1 and 2, the ring 13 has a circular conduit 15 formed at its upper inner side and at one point the conduit 15 has a downward extension 16 for communication with a source of fluid fuel. Merely by way of example, I have shown the apparatus of my invention as arranged to utilize fuel gas but liquid fuel in the form of oil may be employed by making suitable modifications in the equipment and its arrangement. In the illustrated form I contemplate the provision of a plurality of openings 18 in the bottom of the circular conduit 15 for the admission of air to the interior of the conduit 15 for mixture with the fluid fuel. If desired, the annular burner illustrated may be replaced by a plurality of separate circularly arranged fuel jets.

Fuel gas is piped to the ring 13 by any suitable pipings 20 and enters the conduit 15 by way of the downward extension 16 thereof. While automatic control of the operation of the furnace is not necessary to operation of my invention, I have shown schematically a casing 21 which is interposed in the piping 20 and contains a thermostatically controlled valve. Such valve is conventionally arranged in such manner as to control admission of draft air to the furnace so that the furnace will not become cooled by convection currents therethrough after the burner has been turned off by operation of the automatic control valve. Such means are indicated in Fig. 1 where a casing 23 which communicates with the combustion chamber through the ash pit is provided with a valve 24 which operates with the gas control valve through a mechanical connection 25.

A pilot light 28 may be provided and in the illustrated instance the pilot light is fed through a conduit 29 which communicates with the piping 20 beyond the automatic valve mechanism so that it is in constant communication with the gas supply unless it is manually turned off by means of a valve 30. To supply oxygen for operation of the pilot 28 a small vent 31 is provided in the wall of the casing 23. Of course many forms of protective devices for both the pilot light and the feeding of fuel to the burner may be employed in conjunction with the apparatus of my invention without affecting the novel mode of operation proposed herein.

I shall now describe an element which is disposed within the combustion chamber and is of such conformation and is so positioned as to affect the fluid current through the furnace both prior to and after its passage past the burner. The shape and arrangement of the element referred to here will vary with variations in the arrangement of the combustion chamber and the burners of furnaces to which my invention is to be applied but in furnaces which have the conventional fire pot and combustion chamber, and are of the type illustrated in the drawing herein, the element may take the form of a shell whose general conformation is somewhat like that of a paraboloid with an upper surface which may be relatively flat or which may, if desired, continue upwardly to approximately simulate the conformation of the upper portion of the interior of the furnace.

In the specific example of the drawing I have shown a lower casing portion 33 which comprises a relatively thin cast iron wall and a cap or cover member 34 therefor. For more flexible and efficient operation I preferably fill the interior space so provided with a good insulating and heat resisting material such as rock wool or the like and this material is designated 35 in the drawing. The relatively thin heat conducting casing wall and the fact that the large space inside the casing is not heat absorbent minimizes the amount of heat that might, under other conditions, pass off at the top of the casing into the flue and be wasted.

The novel means which I provide in my present invention for positioning the heat conducting element 33, 34 and for improving the method of accomplishment and efficiency of its heat distributing function include a number of pairs of overlapping, flat, plate-like fin elements in which the individual elements of each pair are adjustable to vary the effective width of the assembled pair of elements.

In the form illustrated I provide a number of fins 36 which are rigidly associated with the element 33 and may in fact be formed integrally therewith. The individual fins 36 extend substantially from the top to the bottom of the element 33, are uniformly spaced about the circumference thereof, and preferably lie in vertical planes, although this latter is not a necessary arrangement.

Each rigid fin 36 carries a somewhat overlapping fin 37 of generally similar outline and means are provided for securing each fin 37 to its associated fin 36 in such manner that the fin 37 may be moved toward and away from the element 33 and secured in adjusted position. In the exemplary embodiment illustrated in the drawing such means comprise a plurality of parallel pairs of slots 38 and 39 formed in the fins 36 and 37, respectively, and a bolt and nut assembly 40 for cooperation with each pair of aligned slots 38 and 39.

It will be clear from the foregoing that the outer terminal points of the several fin assemblies may be set and adjusted to control the disposition of the element 33 with respect to the remaining elements of the furnace and that such outer terminal points engage the upper inside edge of the ring 13 at a number of points about its periphery to adequately support and position the element 33.

The ability to so adjust the extent of the fin assemblies affords a number of advantages. The benefits to be derived from the possibility of using an element 33 of one size in any one of a number of furnaces of varying size and interior conformation are apparent. In addition to this, however, adjustment of the fins may be made in the case of a given furnace to vary the spacing of the outer surface of the element 33 from the flame issuing from the burner and from the inner wall of the furnace. Further, such adjustment makes possible the varying of the surface of radiation of the combined element 33 and fins 36 and 37 with respect to the capacity of the assembled furnace and heat conducting element for the passage of draft air.

It will be noted that with the heat conducting body in its illustrated position, the lower convex or ovoid portion of the element 33 projects downwardly into the space enclosed within the ring 13 and in such manner as to present an upwardly diverging more or less conical wall leading to the region of the burner slot 14. Progressing upwardly beyond the burner, the wall of the element 33 of the heat conducting body approaches a position of relatively close proximity to the inner wall of the fire pot or combustion chamber 11 and continues in such close proximity to a point substantially at or above the largest lateral dimension of the combustion chamber.

It is particularly to be noted that the ring 13 fits closely over the opening between the combustion chamber 11 and the lower draft chamber or ash pit 12 and that as a consequence no air is permitted to enter the combustion chamber 11 save through the central opening in the ring 13. When the furnace is put into operation and gas is supplied to the annular burner ring, the burner heats the element 33 to a red heat and owing to the high heat conductivity of the element 33, together with its radiating fins 36, 37, the heat is conducted over a substantial area of the element 33, both upwardly and downwardly of the burner. In fact, the high degree of heat imparted to the element 33 in this manner carries down along the converging lower portion of the element 33 to its very bottom.

It will be seen from the foregoing that air coming to the combustion chamber from the draft passage 12 comes into contact with this highly heated lower portion of the element 33 before it arrives at the point of combustion and is so brought to a relatively high temperature before reaching the vicinity of the burner. With the surrounding atmosphere in such a heated state, the gas issuing from the burner slot or jet 14 is very much closer to its natural ignition temperature and a much more thorough and efficient combustion thereof takes place than in prior art practices.

The burner and the element 33 are so arranged that the annular flame plays directly against the adjacent wall of the element 33 and the fins 36, 37, and the wall of the element 33 above the burner is so arranged that whatever heat is not conducted to the bottom of the element 33 for preheating draft air is radiated from the wall of the element 33 to the closely adjacent wall of the combustion chamber. At the point where the walls of the combustion chamber 11 begin to converge upwardly, the natural convection current of the hot products of combustion is upward against the wall of the chamber and consequently there is no need for continuing the element 33 above the point of the largest lateral dimension of the combustion chamber.

Access may be had to the interior of the combustion chamber 11 by means of the door 44 and in order that the pilot light 28 may be rendered accessible for lighting and inspection, the element 33 is shown flattened in the vicinity of the door 44 as at 45. The efficiency of heat transfer of the present invention, as well as the all-around efficiency of combustion, is proved by the relative economy of operation as compared with furnaces of other types using the same fuel and operating under comparable conditions in other respects.

I claim:

1. In a furnace having a combustion chamber and an opening at the bottom of said combustion chamber, a conduit leading from a source of draft air to communicate with said opening at its under side, an annular burner disposed about and closely adjacent the upper end of said conduit, a pre-heating element comprising a body disposed within said combustion chamber and having a portion extending downwardly into said conduit, and heat conducting fins associated with said body and extending downwardly from said combustion chamber and into said conduit.

2. In a furnace having a combustion chamber and an opening at the bottom of said combustion chamber, a conduit leading from a source of draft air to communicate with said opening at its under side, an annular burner disposed about and closely adjacent the upper end of said conduit, and a pre-heating element comprising a body disposed within said combustion chamber and spaced from the walls thereof to provide an annular combustion space above said burner, and a plurality of heat conducting fins associated with said body and extending downwardly from said combustion chamber and into said conduit.

3. In a furnace having a combustion chamber and an opening at the bottom of said combustion chamber, a conduit leading from a source of draft air to communicate with said opening at its under side, an annular burner disposed about and closely adjacent the upper end of said conduit, a pre-heating element comprising a body having a downwardly convex portion disposed over and in proximity to said burner with its more central portions disposed below said burner and substantially within said conduit, and a plurality of heat conducting fins associated with said body and extending downwardly from said combustion chamber and into said conduit to be contacted by incoming draft air.

4. In a furnace having a combustion chamber and an opening at the bottom of said combustion chamber, a conduit leading from a source of draft air to communicate with said opening at its under side, an annular burner disposed about and closely adjacent the upper end of said conduit, a pre-heating element comprising a body disposed within said combustion chamber and spaced from the walls thereof to provide an annular combustion space above said burner, and a plurality of thermal fins formed on said body and extending downwardly from said combustion chamber and into said conduit, said fins radiating from said body to engage said annular burner and thereby locate and support the pre-heating element in a substantially coaxial position with respect to the combustion chamber.

5. In a furnace having a combustion chamber and an opening at the bottom of said combustion chamber, a conduit leading from a source of draft air to communicate with said opening at its under side, an annular burner disposed about and closely adjacent the upper end of said conduit, a pre-heating element comprising a body of heat conducting material having a portion extending downwardly into said conduit, and a plurality of fins associated with said body and radiating therefrom, each fin comprising a portion rigidly associated with said body and a second portion movable toward and away from said body, and means for adjustably securing said second portion with respect to said first portion.

6. In a furnace having a combustion chamber and an opening at the bottom of said combustion chamber, a conduit leading from a source of draft air to communicate with said opening at its under side, an annular burner disposed about and closely adjacent the upper end of said conduit, a pre-heating element comprising a body disposed within said combustion chamber and spaced from the walls thereof to provide an annular combustion space above said burner, and a plurality of thermal fins formed on said body and extending downwardly from said combustion chamber and into said conduit, each fin comprising a portion rigidly associated with said body, a second portion movable toward and away from said body, and means for adjustably securing said second portion with respect to said first portion.

7. In a furnace having a combustion chamber and an opening at the bottom of said combustion chamber, a conduit leading from a source of draft air to communicate with said opening at its under side, an annular burner disposed about and closely adjacent the upper end of said conduit, a pre-heating element comprising a body disposed within said combustion chamber and spaced from the walls thereof to provide an annular combustion space above said burner, a plurality of fins formed on said body and radiating therefrom, a second fin disposed laterally against each of said first-mentioned fins and extending downwardly into said conduit, and means for adjustably securing each of said second fins to a first-mentioned fin to vary the effective depth of the composite fin formed thereby.

CARL H. LENGYEL.